(12) United States Patent
Gupta et al.

(10) Patent No.: US 10,300,557 B2
(45) Date of Patent: May 28, 2019

(54) HYBRID SUBSTRATE PROCESSING

(71) Applicant: Apple Inc., Cupertino, CA (US)

(72) Inventors: Nathan K. Gupta, San Francisco, CA (US); Simon R. Lancaster-Larocque, San Jose, CA (US); Prithu Sharma, Cupertino, CA (US); Weibo Cheng, Santa Clara, CA (US); Abhijit A. Kangude, Fremont, CA (US); Bryan W. Posner, San Francisco, CA (US); Sudirukkuge T. Jinasundera, San Jose, CA (US); Karan Bir, Waterloo (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/712,646

(22) Filed: Sep. 22, 2017

(65) Prior Publication Data

US 2018/0085857 A1  Mar. 29, 2018

Related U.S. Application Data

(60) Provisional application No. 62/398,743, filed on Sep. 23, 2016.

(51) Int. Cl.
| | |
|---|---|
| *B23K 26/36* | (2014.01) |
| *B23K 26/00* | (2014.01) |
| *B23K 26/08* | (2014.01) |
| *B23K 26/0622* | (2014.01) |
| *B23K 26/53* | (2014.01) |
| *B23K 103/00* | (2006.01) |

(52) U.S. Cl.
CPC .......... *B23K 26/36* (2013.01); *B23K 26/0006* (2013.01); *B23K 26/0622* (2015.10); *B23K 26/08* (2013.01); *B23K 26/53* (2015.10); *B23K 2103/54* (2018.08)

(58) Field of Classification Search
None
See application file for complete search history.

(56) References Cited

U.S. PATENT DOCUMENTS

| | | | | |
|---|---|---|---|---|
| 5,741,431 | A * | 4/1998 | Shih | H01L 21/30604 216/65 |
| 7,255,806 | B2 * | 8/2007 | Yoshimura | B23K 26/0648 216/24 |
| 8,753,990 | B2 * | 6/2014 | Gupta | B23K 26/0084 216/65 |
| 9,221,125 | B2 | 12/2015 | Qi et al. | |
| 9,629,271 | B1 | 4/2017 | Lancaster-Larocque et al. | |
| 2007/0125746 | A1 * | 6/2007 | Koide | B23K 26/16 216/65 |

(Continued)

*Primary Examiner* — Shamim Ahmed
(74) *Attorney, Agent, or Firm* — Kilpatrick Townsend & Stockton LLP

(57) ABSTRACT

A hybrid laser modulation and acid etch process for the creation of a patterned substrate. According to some embodiments, a hole is formed in a glass substrate by first modulating a portion of the substrate in the desired shape. A mask is coated on the glass substrate and is patterned to expose the modulated portion. The glass substrate is then acid etched to remove the modulated portion. Once the modulated portion has been etched, the desired shape may be removed from the glass substrate and the mask may be stripped.

21 Claims, 7 Drawing Sheets

(56) References Cited

U.S. PATENT DOCUMENTS

| | | | |
|---|---|---|---|
| 2010/0025387 A1* | 2/2010 | Arai | B28D 5/00 |
| | | | 219/121.69 |
| 2013/0029092 A1* | 1/2013 | Wakioka | H05K 3/002 |
| | | | 428/131 |
| 2014/0263211 A1 | 9/2014 | Hassan et al. | |
| 2015/0017389 A1* | 1/2015 | Chai | G03F 1/54 |
| | | | 428/156 |
| 2015/0287638 A1* | 10/2015 | Park | H01L 21/78 |
| | | | 438/462 |
| 2016/0158886 A1* | 6/2016 | Kumar | B23K 26/006 |
| | | | 219/121.61 |
| 2017/0160766 A1 | 6/2017 | Gupta et al. | |
| 2017/0197868 A1 | 7/2017 | Gupta et al. | |
| 2017/0199405 A1 | 7/2017 | Gupta et al. | |

* cited by examiner

HYBRID SUBSTRATE PROCESSING

CROSS-REFERENCES TO RELATED APPLICATIONS

This application claims the benefit of U.S. Provisional Patent Application No. 62/398,743, filed Sep. 23, 2016, and is hereby incorporated by reference in its entirety.

FIELD

The present disclosure relates generally to the manufacturing of a patterned substrate using a hybrid laser modulation and acid etch process.

BACKGROUND

Many processes exist for patterning substrates to create holes therein. For example, according to one conventional process, mechanical drilling may be used to create holes in glass substrates. Mechanical drilling is insufficient for some applications, however. For example, mechanical drilling may undesirably weaken the mechanical strength of the substrate drilled and it may be difficult to create certain shapes in glass substrates using a mechanical drilling process.

Other processes to create holes in glass substrates have been developed that provide better results for some applications. For example, laser ablation may be used to create holes in glass substrates. Although laser ablation can improve upon some of the disadvantages of mechanical drilling, laser ablation also has some drawbacks that can make it undesirable for certain applications.

SUMMARY

Various embodiments of the disclosure pertain to a hybrid laser modulation and acid etch process for the creation of a patterned substrate that improve upon some or all of the above-described deficiencies. According to some embodiments of the disclosure, a hole is formed in a glass substrate by first modulating a portion of the substrate in the desired shape by exposing the substrate to a pulsed laser beam. A mask is coated on the glass substrate and is patterned to expose the modulated portion. The glass substrate is then acid etched to remove the modulated portion. Once the modulated portion has been etched, the desired shape may be removed from the glass substrate and the mask may be stripped.

According to some embodiments of the disclosure, improved glass substrate properties may be observed using the hybrid laser modulation-acid etch process. For example, the hybrid process may result in high mechanical strength, minimum cost, for example, due to minimum acid consumption, reduced processing time, and/or reuse of the removed portion of the substrate), controllable taper, zero heat-affected zone, small burr size (e.g., <1 µm), high circularity (e.g., 99%), no chipping, excellent edge quality, and/or minimal edge roughness (e.g., ~0 µm). In other words, some embodiments of the disclosure result in naturally smooth edges with no additional post-processing needed. In addition, some embodiments of the disclosure may be used to create an infinite number of shapes in the glass substrate.

In some embodiments, a method is provided. The method includes providing a substrate; modulating a first portion of the substrate by exposing the first portion to a pulsed laser while a second portion of the substrate remains unmodulated; and then etching the first portion of the substrate.

In some embodiments, a method of forming a hole in a glass substrate is provided. The method includes exposing the glass substrate to a pulsed laser beam according to a first predetermined pattern that defines a perimeter of the hole. A wavelength, power and pulse duration of the laser beam are selected to modify properties of the glass substrate in the area correspond to the first predetermined pattern without ablating the glass substrate, thereby forming a modulated area. The method further includes depositing a mask over the glass substrate including the modulated area. The method further includes patterning the mask according to a second predetermined pattern that corresponds with the first predetermined pattern to form a patterned mask area. The method further includes etching through the mask and the glass substrate in the patterned mask area and stripping the mask from the glass substrate.

In some embodiments, a method of forming a hole in a substrate comprising material transparent to a laser (e.g., a glass or sapphire substrate) is provided. The method can include exposing a first portion of the substrate to a pulsed laser beam according to a first predetermined pattern that defines a perimeter of the hole, wherein a wavelength, power and pulse duration of the laser beam are selected to modify properties of the substrate in the area corresponding to the first predetermined pattern without ablating the substrate, forming a modulated area that surrounds a second portion of the substrate; etching through the substrate in the modulated area; and removing the second portion of the substrate.

The following detailed description together with the accompanying drawings in which the same reference numerals are sometimes used in multiple figures to designate similar or identical structural elements, provide a better understanding of the nature and advantages of the present disclosure.

DETAILED DESCRIPTION

Figure 1:
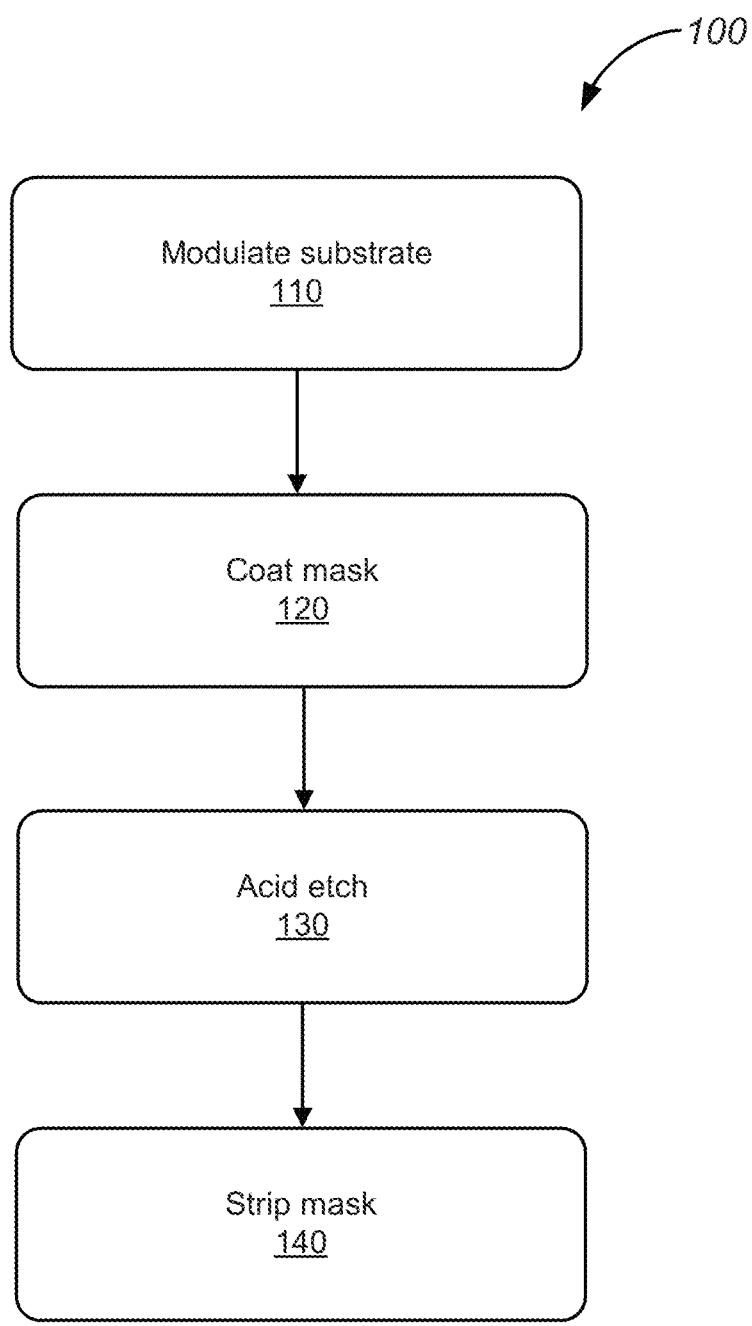
FIG. 1 is a flow diagram of a method of processing a substrate according to an embodiment of the disclosure.
Figure 2A:
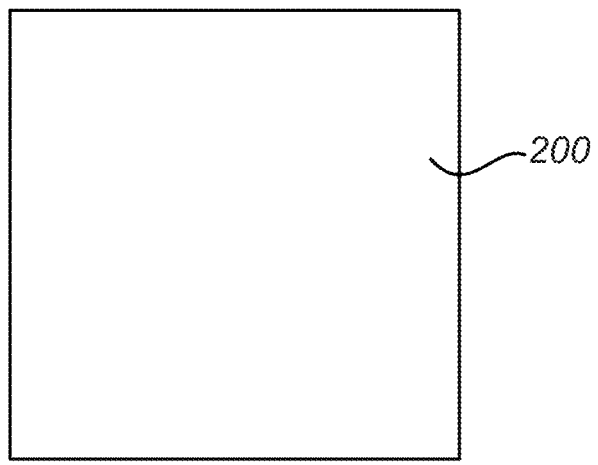
FIG. 2A is a top view of a substrate that may be modulated according to an embodiment of the disclosure.
Figure 2B:
FIG. 2B is a cross-sectional view of a substrate that may be modulated according to an embodiment of the disclosure.

Reference is now made to FIG. 1, which depicts a flow diagram 100 of a method for hybrid laser modulation-acid etch substrate processing according to some embodiments of the disclosure. At step 110, a substrate is modulated to change the microstructure and refractive index of the substrate in an area defining where a hole is to be formed in the substrate. FIG. 2A depicts a top view of a substrate 200 that may be modulated according to some embodiments of the disclosure. FIG. 2B depicts a cross-sectional view of the substrate 200. Substrate 200 may be made of any material that does not block laser beams, such as transparent materials. For example, substrate 200 may comprise glass, plastic, acrylic, sapphire, and/or the like. Although shown as being a particular size, shape, and thickness, it is contemplated that substrate 200 may be of any size, shape, and/or thickness, and have any suitable dimensions.

Figure 3A:
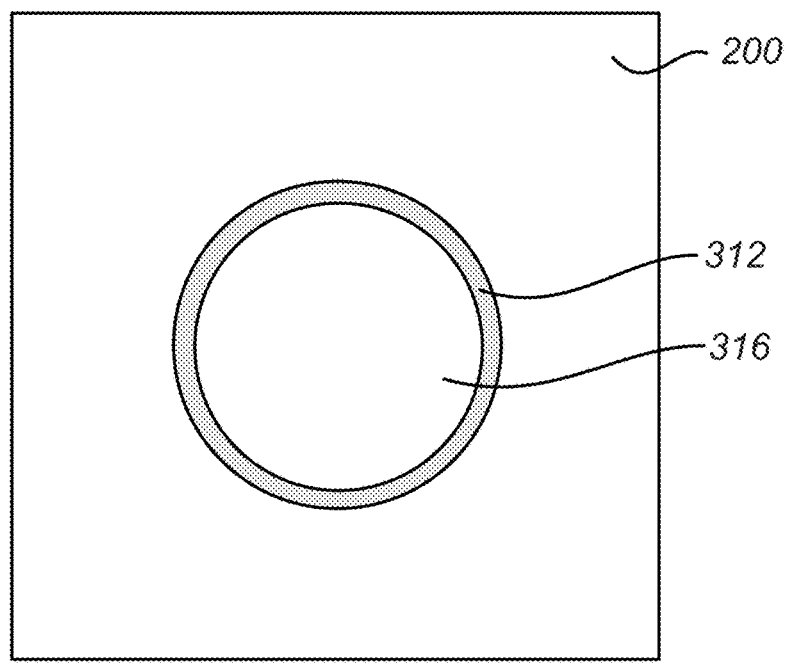
FIG. 3A is a top view of a substrate that has been modulated according to an embodiment of the disclosure.

The substrate may be modulated in a desired portion to be removed from substrate 200. In some embodiments, the entire area to be removed from the substrate is modulated in step 110, while in other embodiments, the substrate is modulated according to a predetermined pattern that defines a perimeter of the area to be removed. FIG. 3A depicts a top view of a substrate 200 that has been modulated according to a circular pattern in portion 312 per the latter approach as part of a process to form a circular hole in the substrate defining a portion 316 of substrate 200 that can be removed. Although portion 312 is shown in a particular pattern, it is contemplated that portion 312 may be of any size, shape, and/or thickness, and have any suitable dimensions.

Figure 3B:
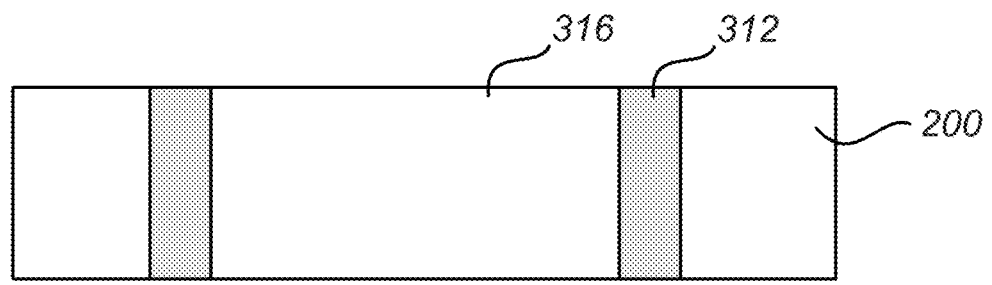
FIG. 3B is a cross-sectional view of a substrate that has been modulated according to an embodiment of the disclosure.

FIG. 3B depicts a cross-sectional view of the substrate 200 that has been modulated in portion 312. Portion 312 may be modulated with a laser beam to structurally change substrate 200 in portion 312. In some embodiments, the laser beam may be a ultra-short, ultra-fast high-intensity pulse laser emitting bursts of pulses. Short pulse wavelengths may be employed to modulate the substrate 200, as opposed to ablating, vaporizing and/or burning off the substrate 200, which may occur with longer pulse wavelengths. Exemplary laser wavelengths that may be used include those in the green spectrum (e.g., 532 nm), those in the infrared spectrum (e.g., 1064 nm), and/or those in the blue spectrum (e.g., 355 nm). In some embodiments, the laser may be a picosecond laser, and in some embodiments the picolaser can emit bursts of 12-24 nanosecond pulses at a frequency of approximately 200 KHz.

Figure 3C:
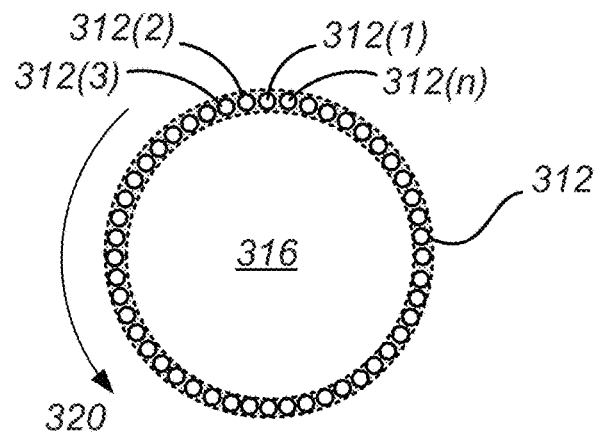
FIG. 3C is a microscopic top view of a substrate that has been modulated according to an embodiment of the disclosure.

During step 110, the laser can be moved across substrate 200 according to a path that defines portion 312. The speed at which the laser is moved along the path may result in a path of closely spaced circular exposure regions 312(1)-312(n) in portion 312 as shown in FIG. 3C, which illustrates a simplified top view of path 312 shown in FIG. 3A, created by moving the laser along the circular path 312 in the direction indicated by arrow 320.

The laser may employ particular optics to generate an elongated beam shape, such as Bessel optics, axicon lenses, diffraction lenses, and the like. Due to the elongated beam shape and the ultra-fast pulses, the laser may structurally change portion 312 of substrate 200 in a single pass, such that each area of portion 312 may receive one pulse in some embodiments. For example, in the case of a glass substrate 200, a thickness of up to about 3 mm may be modulated in one pass with the laser beam collimated in a depth of focus between 0.1 to 3 mm. In some embodiments, the laser beam may make more than one pass over portion 312 and be focused at different depths of the substrate in each pass. The laser may operate at a power level below the ablation threshold of the material of substrate 200.

Figure 4:
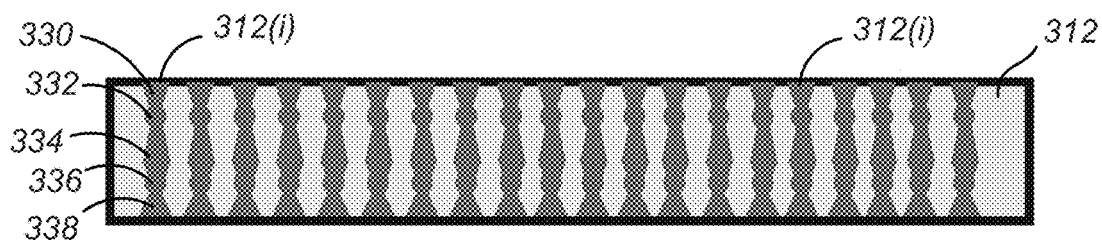
FIG. 4 is a microscopic cross-sectional view of a substrate that has been modulated according to an embodiment of the disclosure.

Once modulated, dotted and/or hourglass structures $312(i)$ may be seen in portion 312 under a microscope at each location that the substrate was exposed to a pulsed laser beam. FIG. 4 depicts a cross-sectional view of portion 312 as seen under a microscope. Each individual hourglass-like structure $312(i)$ shown in FIG. 4 can be representative of one of the exposure regions 312(1)-312(n) shown in FIG. 3C. As the pulsed laser enters the substrate to forms each individual structure $312(i)$, the light modifies physical properties of the substrate changing its refractive index. The laser beam thus sees the substrate as having a different refractive index at different depths of each structure $312(i)$ and bends and refocus accordingly to an extent that a plasma can be generated within the substrate. The plasma can then interfere with the focusing process and thus defocusing the light. At very high intensities that can be used by the picosecond laser according to embodiments of the disclosure, this process can be self-induced.

Regions in which the light bends and refocuses can be referred to as regions of Kerr-lens focusing and are shown as regions 330, 334 and 338 in FIG. 4. The regions at which a plasma can be formed that defocuses the light are shown as regions 332 and 336. At the conclusion of the process, transparent substrate 200, the modulated portion of substrate 200 formed by the combined structures $312(i)$ can change the refraction index of substrate 200 in the area of portion 312. In some embodiments, the individual regions 332, 336, represented in FIG. 4 by dots, created in each structure $312(i)$ may have a diameter in the range of about 1 micron to about 10 microns.

Turning back now to FIG. 1, at step 120, a mask is coated on the substrate. For example, a mask may be coated entirely on substrate 200 (i.e., top, bottom, and sides, including portion 312). The mask may then be patterned using photolithography to expose portion 312 of substrate 200. In some embodiments, the mask is a photoresist. Exemplary photoresists that may be used include any commercially available photoresist, such as PMMA, AZ4620, AZ4562, and the like.

Figure 5A:
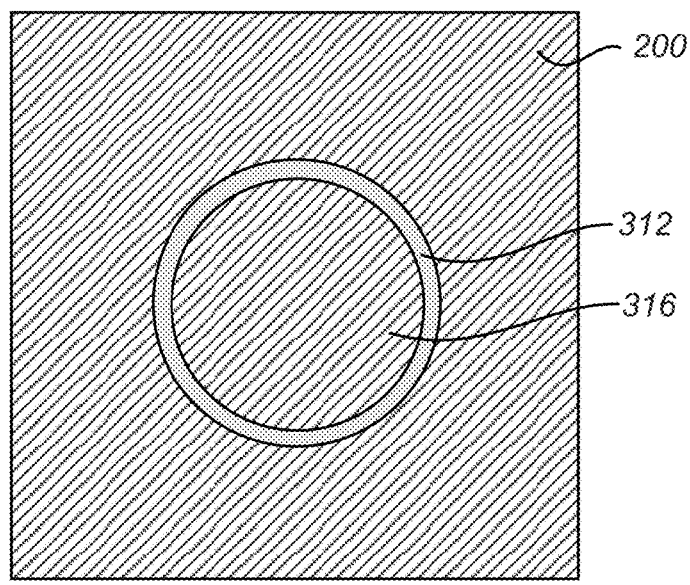
FIG. 5A is a top view of a substrate having a multi-layered hard mask applied and patterned thereon according to an embodiment of the disclosure.
Figure 5B:
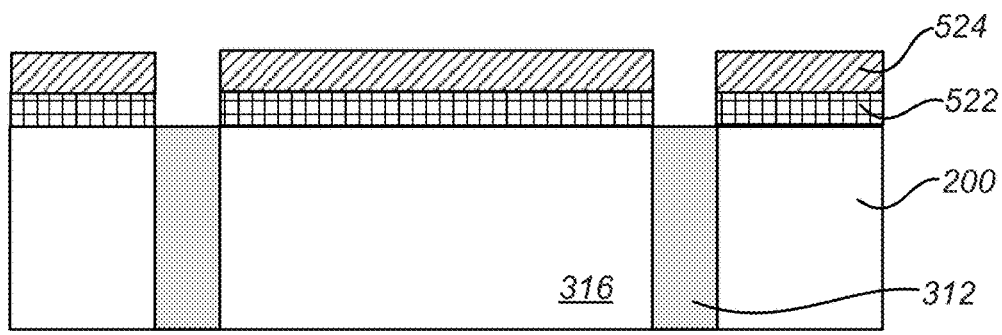
FIG. 5B is a cross-sectional view of a substrate having a multi-layered hard mask applied and patterned thereon according to an embodiment of the disclosure.

In some embodiments, the mask is a hard mask. The hard mask may be multilayered in some embodiments. FIGS. 5A and 5B depict a top view and a cross-sectional view, respectively, of a substrate 200 having a multi-layered hard mask applied and patterned thereon. The multi-layered hard mask includes a lower layer 522 and an upper layer 524. The lower layer 522 and upper layer 524 have been patterned to expose portion 312 of substrate 200. The lower layer 522 and the upper layer 524 may be patterned according to any suitable method. Although shown in FIG. 5B as being applied to the top surface of the substrate 200, it is contemplated that the lower layer 522 and the upper layer 524 may be alternatively or additionally applied to the side surfaces and bottom surfaces of the substrate 200. In some embodiments, the lower layer 522 and the upper layer 524 may be applied to all exposed surfaces of the substrate 200, then patterned to expose portion 312 of substrate 200.

The lower layer 522 and the upper layer 524 may include any of a number of materials. In one example, the lower layer 522 may include chrome of a first thickness (e.g., 500 Å), while the upper layer 524 may include amorphous silicon of a second thickness (e.g., 5000 Å). In this example, the chrome lower layer 522 may be deposited using physical vapor deposition, for example, while the amorphous silicon upper layer 524 may be deposited using plasma-enhanced chemical vapor deposition. However, it is contemplated that any suitable materials may be used for lower layer 522 and upper layer 524 in any thicknesses and may be deposited by any suitable methods.

Figure 6A:
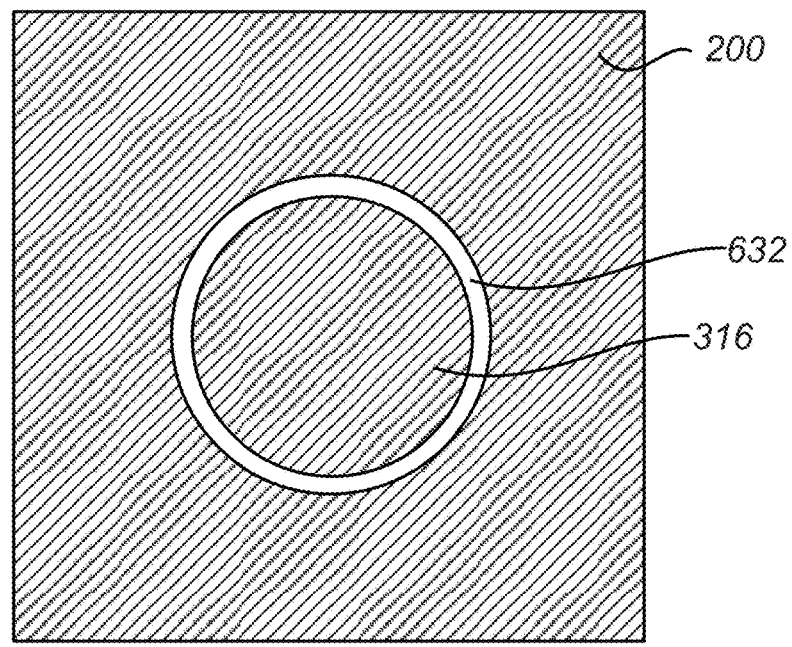
FIG. 6A is a top view of a substrate that has been acid etched according to an embodiment of the disclosure.
Figure 6B:
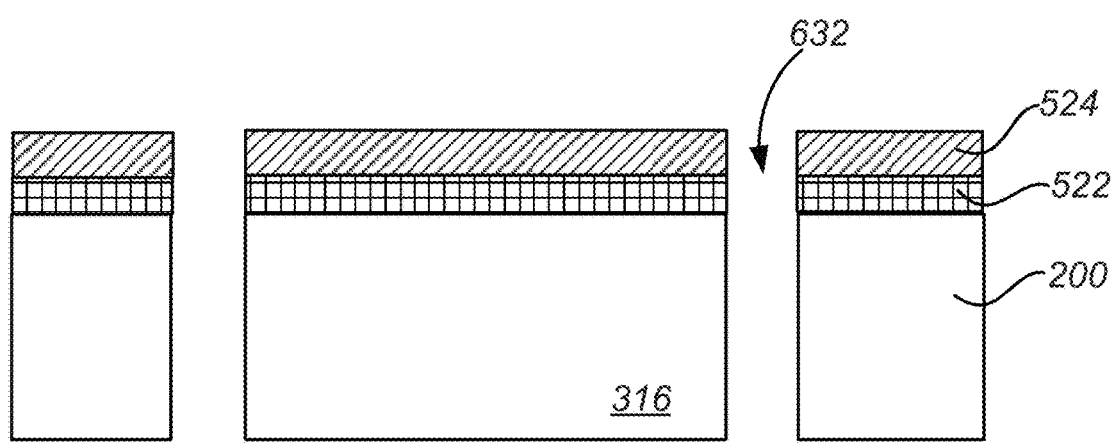
FIG. 6B is a cross-sectional view of a substrate that has been acid etched according to an embodiment of the disclosure.

Turning back now to FIG. 1, at step 130, the substrate may be acid etched, e.g., by being exposed to acid and/or placed in an acid bath. The acid etches the modulated portion of the substrate from the substrate, while the remainder of the substrate may remain protected by the mask. In some embodiments, the substrate and the patterned portion of the mask may be etched in a single step. FIGS. 6A-6B depict a top view and a cross-sectional view, respectively, of a substrate 200 that has been acid etched. Modulated portion 312 has been removed from substrate 200, leaving an opening 632 that defines the shape of the desired hole to be formed in the substrate (a circular shape, in this example). While not shown in FIG. 6B, in some embodiments, the isotropic nature of the etch process in step 130 may result in opening 632 having an hour glass shape where the opening is wider at the opposing surfaces of substrate 200 and narrower in the center. The hour glass shape may beneficially provide a smooth, curved surface along the inner perimeter of the hole defined by opening 632. The portion of substrate 200 that was not modulated may generally not be acid etched, as it was protected by multi-layered hard mask 522, 524. In addition, because portion 312 is modulated, its etch rate may be significantly higher than the unmodulated portion of substrate 200 (e.g., 10 times higher). Thus, even though a portion of substrate 200 inside opening 632 may be exposed to the acid, it may not be significantly etched.

Any suitable acid may be used to acid etch substrate 200. The type of acid may be selected based on the material of the substrate (e.g., glass), the type of mask used (e.g., a photoresist or a hard mask), the material of the mask used (e.g., chrome, amorphous silicon, PMMA, etc.), and the like. For example, a glass having a higher concentration of $SiO_2$ may require a higher HF-rich acid in order to be etched. In another example, a glass having a lower concentration of $SiO_2$ may only need a diluted HF acid. Exemplary acids include HF, HFHCl, $HFHNO_3$, diluted HF, HF only, $NH_4F$, and the like.

Figure 7A:
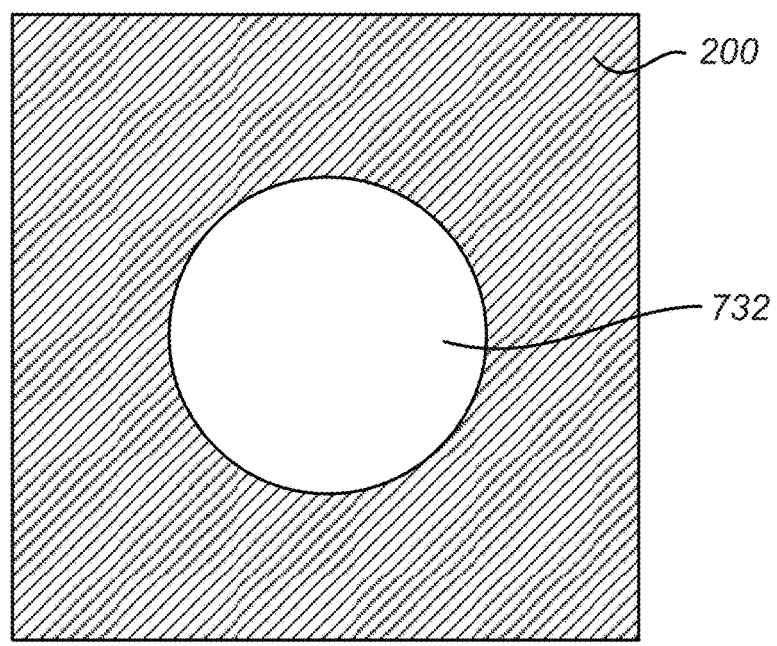
FIG. 7A is a top view of a substrate with a portion removed according to an embodiment of the disclosure.
Figure 7B:
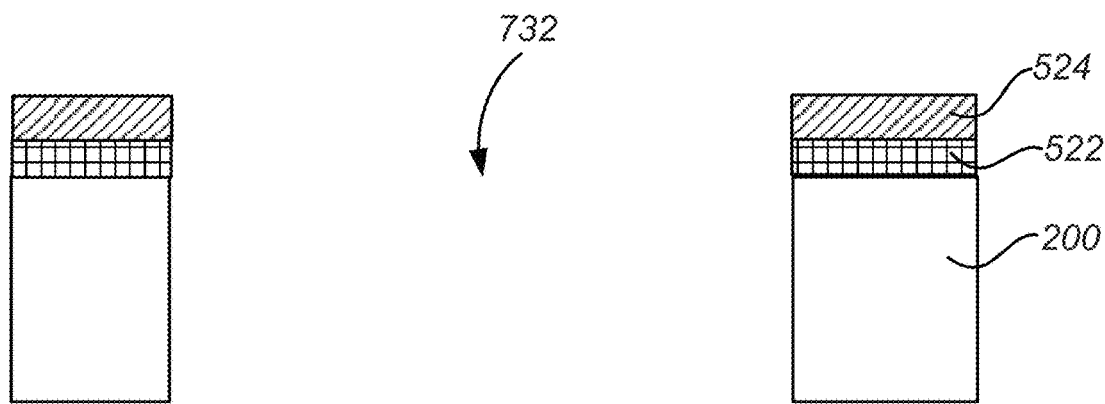
FIG. 7B is a cross-sectional view of a substrate with a portion removed according to an embodiment of the disclosure.

Once substrate 200 is acid etched, portion 316 of substrate 200 within the opening 632 may be removed, forming the desired hole. In some embodiments, removing the portion of substrate 200 within the opening 632 may include applying a force to either portion 316. FIGS. 7A-7B depict a top view and a cross-sectional view, respectively, of substrate 200 with the portion of substrate 200 within the opening 632 removed, leaving a hole 732 in substrate 200, lower layer 522, and upper layer 524. The removed portion of substrate 200 may be reused for other purposes or applications in some embodiments.

Figure 8A:
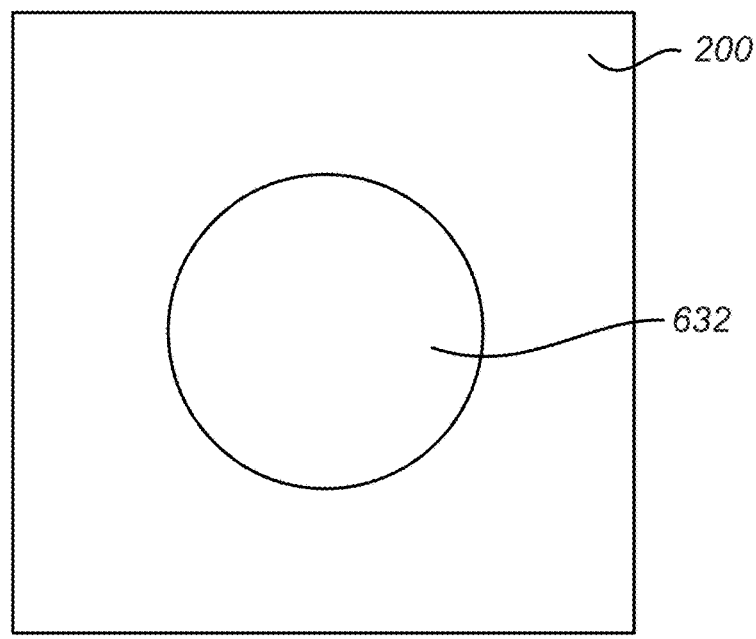
FIG. 8A is a top view of a substrate with a hole according to an embodiment of the disclosure.
Figure 8B:
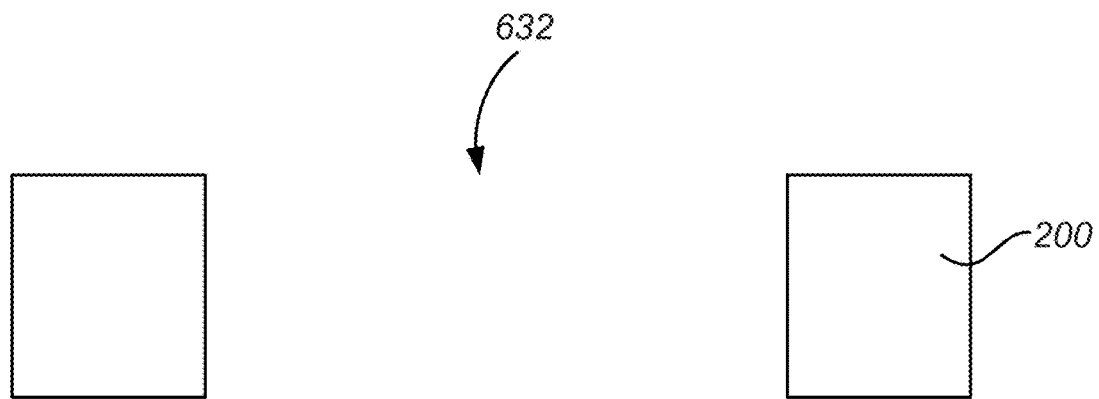
FIG. 8B is a cross-sectional view of a substrate with a hole according to an embodiment of the disclosure.

Turning back now to FIG. 1, at step 140, the mask may be stripped from the substrate, leaving only the patterned substrate. FIGS. 8A-8B depict a top view and a cross-sectional view, respectively, of substrate 200 with the hole 632. The mask may be stripped from substrate 200 using any suitable method for that particular type of mask (e.g., the stripping method for a photoresist may differ from the stripping method for a hard mask). In some embodiments, it is contemplated that the mask may be stripped from the substrate 200 prior to the portion of substrate 200 within the opening 632 being removed.

Although shown and described as applying a mask for use during the acid etch process, it is contemplated that, in some embodiments, a mask may not be applied to the substrate prior to acid etching. Because the modulated portion of the substrate etches at a much faster rate than the unmodulated portion of the substrate, the modulated portion may etch through the substrate while a substantial thickness of the unmodulated portion still remains. These embodiments may result in a desirable finish on the substrate, although some substrate thickness may be lost. Nevertheless, these embodiments may be desirable from a cost-yield perspective in some situations.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

What is claimed is:

1. A method of forming a hole in a substrate comprising material transparent to a laser, the method comprising:
    forming a modulated area according to a first predetermined pattern in the substrate by exposing the substrate to a pulsed laser beam according to the first predetermined pattern, wherein the first predetermined pattern defines a perimeter of the hole and surrounds a first portion of the substrate, and wherein a wavelength, power and pulse duration of the laser beam are selected to modify properties of the substrate in the modulated area without ablating the substrate;
    depositing a mask over the substrate including the modulated area, the first portion of the substrate and a second portion of the substrate that surrounds the modulated area;
    patterning the mask according to a second predetermined pattern that corresponds with the first predetermined pattern to form a patterned mask area;
    etching through the mask and the substrate in the patterned mask area;
    stripping the mask from the substrate; and
    separating the first portion of the substrate from the second portion of the substrate.

2. The method of claim 1 wherein the first portion of the substrate is exposed to pulses from a picosecond laser during the modulating.

3. The method of claim 2 wherein the laser creates a Bessel beam.

4. The method of claim 2 wherein the laser modulates the first portion of the substrate at a power level below an ablation threshold of the substrate.

5. The method of claim 1 wherein modulating the first portion of the substrate changes a refractive index of the first portion of the substrate.

6. The method of claim 1 wherein modulating the first portion of the substrate changes a microstructure of the first portion of the substrate.

7. The method of claim 1 wherein the substrate is transparent.

8. The method of claim 1 wherein etching the first portion of the substrate comprises exposing the substrate to acid.

9. The method of claim 1 further comprising:
etching the second portion of the substrate, wherein the first portion of the substrate etches at a faster rate than the second portion of the substrate.

10. The method of claim 1 wherein the mask is patterned using photolithography.

11. The method of claim 1 wherein the mask comprises a hard mask.

12. The method of claim 1 wherein the mask comprises a photoresist.

13. The method of claim 1 wherein after the first portion of the substrate is separated from the second portion of the substrate, edges of the first and second portion have a smooth curved surface.

14. The method of claim 1 wherein the substrate is glass.

15. The method of claim 1 wherein the laser beam has a collimated portion that is collimated in a focal region and the collimated portion is focused on the substrate.

16. The method of claim 1 further comprising, after the mask is removed from the substrate:
applying force to the substrate at a location within the patterned area to remove a section of the substrate corresponding to the hole.

17. The method of claim 1 wherein the mask comprises a photoresist layer and the patterning comprises a photolithography process.

18. A method of forming a hole in a substrate comprising material transparent to a laser, the method comprising:
forming a modulated area in the substrate according to a first predetermined pattern that defines a perimeter of the hole by exposing the substrate to laser beam pulses from a picosecond laser according to the first predetermined pattern, wherein the laser pulses are shaped with optics into an elongated beam shape focused within the substrate and wherein a wavelength, power and pulse duration of the laser beam are selected to modify properties of the substrate in the modulated area without ablating the substrate;
depositing a mask over the substrate including the modulated area, the first portion of the substrate and a second portion of the substrate that surrounds the modulated area;
patterning the mask according to a second predetermined pattern that corresponds with the first predetermined pattern to form a patterned mask area;
etching through the substrate in the modulated area; and
separating the first portion of the substrate from the second portion of the substrate.

19. The method of claim 18 wherein the laser beam is collimated in a depth of focus between 0.1 to 3 mm.

20. The method of claim 19 wherein forming the modulated region is done with a single pass of the laser along the first predetermined pattern.

21. The method of claim 19 wherein forming the modulated region is done with multiple passes of the laser along the first predetermined pattern, wherein in each of the multiple passes the laser is focused at a different depth of the substrate.

* * * * *